US008880439B2

(12) United States Patent
Archambeau et al.

(10) Patent No.: US 8,880,439 B2
(45) Date of Patent: Nov. 4, 2014

(54) ROBUST BAYESIAN MATRIX FACTORIZATION AND RECOMMENDER SYSTEMS USING SAME

(75) Inventors: Cedric Archambeau, Grenoble (FR); Guillaume Bouchard, Crolles (FR); Balaji Lakshminarayanan, London (GB)

(73) Assignee: Xerox Corporation, Norwalk, CT (US)

( * ) Notice: Subject to any disclaimer, the term of this patent is extended or adjusted under 35 U.S.C. 154(b) by 280 days.

(21) Appl. No.: 13/405,796

(22) Filed: Feb. 27, 2012

(65) Prior Publication Data

US 2013/0226839 A1 Aug. 29, 2013

(51) Int. Cl.
G06F 15/18 (2006.01)
G06N 99/00 (2010.01)
G06N 3/08 (2006.01)
G06K 9/62 (2006.01)

(52) U.S. Cl.
CPC ............ *G06N 99/005* (2013.01); *G06K 9/6256* (2013.01); *G06N 3/08* (2013.01)
USPC .......................................................... 706/12

(58) Field of Classification Search
CPC ............................... G06K 9/6256; G06N 3/08
See application file for complete search history.

(56) References Cited

U.S. PATENT DOCUMENTS

| 7,386,547 | B2 | 6/2008 | Grasso et al. | |
|---|---|---|---|---|
| 7,440,943 | B2 | 10/2008 | Grasso et al. | |
| 2009/0299996 | A1* | 12/2009 | Yu et al. | 707/5 |
| 2013/0218907 | A1* | 8/2013 | Nice et al. | 707/751 |

OTHER PUBLICATIONS

Salakhutdinov et al. "Bayesian Probabilistic Matrix Factorization using Markov Chain Monte Carlo", ICML, 2008, pp. 8.*
Shan et al. "Generalized Probabilistic Matrix Factorizations for Collaborative Filtering", TR 1-024, 2010, pp. 13.*
Archambeau, et al. "Robust probabilistic projections" $23^{rd}$ Intl. Conf. on Machine Learning (ICML) 2006, pp. 33-40.
Attias, H. "A variational Bayesian framework for graphical models" Advances in neural information processing systems 12 (NIPS), 2000, pp. 1-7.
Archambeau, et al. "Robust Bayesian clustering" Neural Networks, 2007, 20:129-138.
Beal, M. "Variational algorithms for approximate Bayesian Inference" Ph.D. Thesis, Gatsby Computational Neuroscience Unit, 2003, pp. 1-281.
Bennett, et al. "The Netflix prize" KDD Cup and Workshop, vol. 2007, p. 35.

(Continued)

*Primary Examiner* — Li-Wu Chang
(74) *Attorney, Agent, or Firm* — Fay Sharpe LLP (57) ABSTRACT

In a recommender method, Bayesian Matrix Factorization (BMF) is performed on a matrix having user and item dimensions and matrix elements containing user ratings for items made by users in order to train a probabilistic collaborative filtering model. A recommendation is generated for a user using the probabilistic collaborative filtering model. The recommendation may comprise a predicted item rating, or an identification of one or more recommended items. The recommender method is suitably performed by an electronic data processing device. The BMF may employ non-Gaussian priors, such as Student-t priors. The BMF may additionally or alternatively employ a heteroscedastic noise model comprising priors that include (1) a row dependent variance component that depends upon the matrix row and (2) a column dependent variance component that depends upon the matrix column.

18 Claims, 4 Drawing Sheets

(56) References Cited

OTHER PUBLICATIONS

Croux, et al. "Fitting multiplicative models by robust alternating regressions" Statistics and Computing, 2003, 13(1):23-26.
Chu, et al. "Gaussian processes for ordinal regression" Journal of Machine Learning Research, 2005, 6(1):1019-1041.
Goldberg, et al. "Eigentaste: a constant time collaborative filtering algorithm" Information retrieval, 2001, 4(2):133-151.
Gabriel, et al. "Lower rank approximation of matrices by least squares with any choice of weights" Technometrics, 1979, 21(4):489-498.
Hofmann, et al. "Latent class models for collaborative filtering" Intl. Joint Conf. in Artificial Intelligence (IJCAI), 1999, vol. 16, pp. 688-693.
Khan, et al. "Variational bounds for mixed-data factor analysis" Advances in Neural Information Processing Systems 23 (NIPS), 2010, pp. 1-9.
Liu, et al. "ML estimation of the t distribution using EM and its extensions, ECM and ECME" Statistica Sinica, 1995, 5:19-39.
Lim, et al. "Variational Bayesian approach to movie rating prediction" KDD Cup and Workshop, 2007, pp. 15-21.
Marlin, B. "Missing data problems in machine learning" Ph.D. Thesis, Dept. of Computer Science, University of Toronto, 2008, pp. 1-164.
Mehta, et al. "Robust collaborative filtering" ACM Conf. on Recommender Systems, 2007, pp. 49-56.
Maronna, et al. "Robust lower-rank approximation of data matrices with elementwise contamination" Technometrics, Preprint 2008, 50(3):295-304.
Neal, et al. "A view of the EM algorithm that justifies incremental, sparse, and other variants" Learning in graphical models, 1998, pp. 355-368.
Srebro, et al. "Weighted low-rank approximations" $20^{th}$ Intl. Conf. on Machine Learning, 2003, pp. 1-8.
Nakajima, et al. "Implicit regularization in variational Bayesian matrix factorization" $27^{th}$ Intl. Conf. on Machine Learning, 2003, pp. 815-822.
Delannay, et al. "Collaborative filtering with interlaced generalized linear models" Neurocomputing, 2008, 71:1300-1310.
Raiko, et al. "Principal component analysis for sparse high-dimensional data" $14^{th}$ Intl. Conf. on Neural Information Processing (ICONIP), 2007, pp. 566-575.
Salakhutdinov, et al. "Bayesian probabilistic matrix factorization using Markov chain Monte Carlo" $25^{th}$ Intl. Conf. on Machine Learning (ICML), 2008, pp. 880-887.
Salakhutdinov, et al. "Probabilistic matrix factorization" Advances in Neural Information Processing Systems 21 (NIPS), 2008, vol. 20, pp. 1257-1264.
Jin, B. "A variational Bayesian method to inverse problems with impulsive noise", Sep. 12, 2011, *Journal of Computational Physics* 231.2 (2012): 423-435.
Wiegerinck, W. "Variational approximations between mean field theory and the junction tree algorithm" Uncertainty in Artificial Intelligence (UAI), 2000, pp. 626-633.

\* cited by examiner

ROBUST BAYESIAN MATRIX FACTORIZATION AND RECOMMENDER SYSTEMS USING SAME

BACKGROUND

The following relates to the online retail arts, online service provider arts, recommender system arts, collaborative filtering arts, and related arts.

Recommender systems find application in numerous retail and service applications, among other. A recommender system attempts to predict the preferences or choices of a user, and can be used, by way of illustrative example, to provide recommendations to a user from amongst a catalog of items or services. For example, an online retailer provides a website via which a user (i.e., customer) browses the retailer's catalog of products or services. The retailer desires for the customer to identify products or services for purchase. Toward that end, it is useful for the retailer to be able to automatically identify and present to the customer specific products or services that the customer is likely to want to purchase. The recommender system, in this application, identifies products or services that are likely to be of interest to the customer, and these products are recommended to the customer.

One way to generate such recommendations is based on products or services which the customer has previously viewed or actually purchased. However, this approach assumes that there is a substantial past history of browsing or purchasing available for the customer. This will not be the case for new or infrequent customers, and also will not be the case for existing customers who have not been identified as such by the retailer's online catalog (e.g., by the customer logging into the website or by reading a "cookie" or other identifying information available on the customer's computer). Moreover, even if a substantial past history is available for the customer, it may not be useful for prediction if the customer is browsing in some portion of the online catalog that the customer has not previously visited.

Collaborative filtering is a recommender approach that makes predictions for a given user based on collected information about preferences of many other users. Conceptually, collaborative filtering is based on expectation that, for a given user, the choices of other users whose past history is similar to that of given user is likely to be probative for predicting the preferences or choices of the given user. Collaborative filtering can utilize a database of product ratings provided for various products or services by users of the retailer's product catalog.

A difficulty with collaborative filtering is that the available data is typically sparse. Using the example of a user ratings database, most users have never viewed or purchased most products of the catalog (let alone gone to the effort of inputting a rating for the product). Additionally, the ratings data is typically noisy. For example, in a rating system employing a one-to-five star scale, there is substantial subjectivity as to whether a given customer rates a product as "four stars" or "three stars" (or "three-and-a-half stars", if fractions are allowable). Some users have a tendency to rate more negatively, while others tend to rate more positively. Different users also consider different criteria in rating a product or service. Still further, the ratings data may have substantial outlier content. For example, a customer who receives a defective product may rate the product as "one star" due to the experience of receiving a defective product, even though the product in general may be quite reliable and satisfactory for most customers.

In many collaborative filtering applications, the available data is amenable to representation in a matrix data structure. For example, product ratings can be represented as a two-dimensional matrix in which the rows correspond to customers and the columns correspond to products (or vice versa). In this representation, Probabilistic Matrix Factorization (PMF) is a known technique for performing collaborative filtering. PMF has some ability to handle difficulties such as noise and outliers. However, improved techniques that provide enhanced robustness would be advantageous.

BRIEF DESCRIPTION

In some illustrative embodiments disclosed as illustrative examples herein, an apparatus comprises an electronic data processing device configured to perform a recommender method including: performing Bayesian Matrix Factorization (BMF) on a matrix having user and item dimensions using non-Gaussian priors to train a probabilistic collaborative filtering model; and generating a recommendation for a user comprising a predicted item rating or identification of one or more recommended items using the probabilistic collaborative filtering model.

In some illustrative embodiments disclosed as illustrative examples herein, in a non-transitory storage medium stores instructions executable by an electronic data processing device to perform a recommender method including: (i) performing Bayesian Matrix Factorization (BMF) on a matrix having user and item dimensions using priors having noise terms that vary with both row and column position in the matrix to train a probabilistic collaborative filtering model and (ii) generating a recommendation for a user comprising a predicted item rating or identification of one or more recommended items using the probabilistic collaborative filtering model.

In some illustrative embodiments disclosed as illustrative examples herein, a method comprises: performing Bayesian Matrix Factorization (BMF) on a matrix having user and item dimensions and matrix elements containing user ratings for items made by users wherein the BMF employs priors that include (1) a row dependent variance component that depends upon the matrix row and (2) a column dependent variance component that depends upon the matrix column to train a probabilistic collaborative filtering model; and generating a recommendation for a user comprising a predicted item rating or identification of one or more recommended items using the probabilistic collaborative filtering model. The performing and the generating are suitably performed by an electronic data processing device.

DETAILED DESCRIPTION

The following relates to recommender systems for generating a recommendation for a user comprising a predicted item rating or identification of one or more recommended items using a probabilistic collaborative filtering model. The term "user" as used herein encompasses any person acting alone or as a unit (e.g., a corporation, non-profit organization, or so forth) that rates items. Because the users are individual persons or groups of persons, the rating of an item by a user is subject to noise due to individual differences, personal biases, and so forth. An "item" as used herein is a product, service, or other subject of ratings assigned by users.

Figure 1:
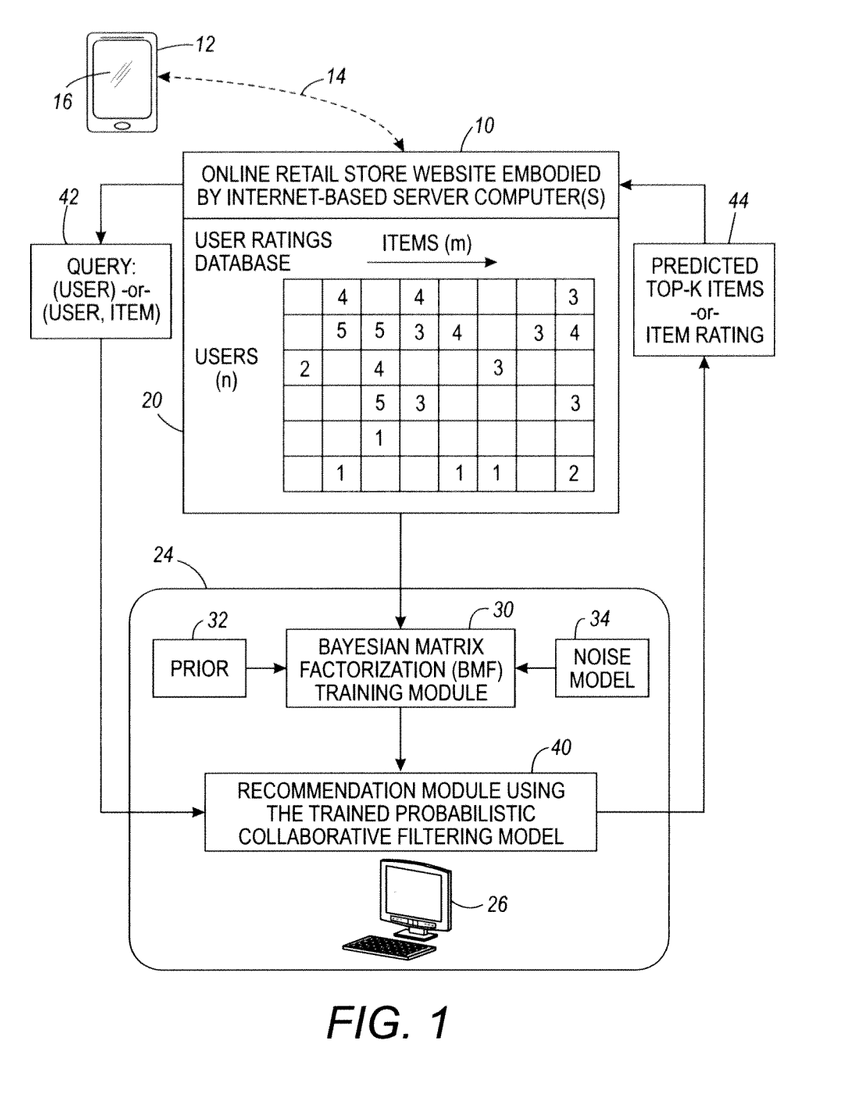
FIG. 1 diagrammatically shows an illustrative recommender system.

With reference to FIG. 1, In the illustrative example, the users are customers and the items are products or services offered by an online retail store website 10 that is embodied by an Internet-based server computer or computers. A customer interacts with the online retail store website 10 using an electronic device 12 such as a desktop computer, notebook computer, electronic tablet, smartphone (illustrated), personal data assistant (PDA), or so forth. The electronic device 12 is operatively connected with the online retail store website via the Internet 14 (diagrammatically indicated by a dashed line; it is to be understood the connection may also include intermediary elements such as a local area wired or wireless network, a firewall, or so forth). The electronic device 12 includes a display 16. Although the single electronic device 12 is shown, it is to be understood that the online retail store website 10 typically serves many customers who typically each use their own electronic device or devices to access the website 10, although some sharing of devices amongst customers is also contemplated.

The online retail store website 10 enables users to rate products or services available on the website 10. In the illustrative example, ratings are on a one-to-five star scale; however, any other rating scale can be employed. The ratings are stored in a user ratings database 20, and are suitably organized in a matrix in which the rows (n) correspond with users (i.e., customers in this example) and the columns (m) correspond with items (i.e., products or services in this example). The illustrative matrix includes only N=6 users and M=8 items; however, the number of users may be in the dozens, hundreds, thousands, tens of thousands, hundreds of thousands, millions or more; and the number of items may be in the dozens, hundreds, thousands, tens of thousands, hundreds of thousands, millions or more. The matrix is typically sparse since most (user, item) elements do not store a rating (that is, a given customer has typically not rated most items, and a given item typically has not been rated by most customers).

During the course of a user's session on the online retail store website 10, it is advantageous to push recommendations to the user. Toward this end, a recommender system or sub-system 24 is provided, which is embodied by an electronic data processing device 26 that is configured (e.g., by being programmed with suitable software or firmware) to perform a recommender method as disclosed herein. The electronic data processing device 26 may be the same Internet-based server computer or computers (e.g., computer cloud) embodying the online retail store website 10, or the electronic data processing device 26 may be a different computer or device that is in operative communication with the online retail store website 10. The recommender system or sub-system 24 is configured to implement a Bayesian Matrix Factorization (BMF) training module 30 that performs BMF on the user ratings matrix 20 having user and item dimensions (n,m) using suitable priors 32 and a noise model 34 in order to train a probabilistic collaborative filtering model.

The recommender system or sub-system 24 is further configured to implement a recommendation module 40 that generates a recommendation for a user using the probabilistic collaborative filtering model. More particularly, the recommendation module 40 receives a query 42, which may comprise a user or a (user, item) pair, and returns a recommendation 44. If the query 42 is a (user, item) pair, then the recommendation module 40 generates the recommendation 44 in the form of a predicted item rating for the item. The predicted item rating is a prediction of the rating that the user of the (user, item) pair would be expected to assign to the item of the (user, item) pair. On the other hand, if the query 42 is a user (alone, without a paired item), then the recommendation module 40 generates the recommendation 44 in the form of an identification of one or more recommended items, e.g. a "top-K" items. To do this, the recommendation module 40 generates predicted ratings for the user for each item available at the online retail store website 10 (or for a subset of these items, e.g. for all jazz music albums in the music department of the online retail store website 10), ranks the items according to the predicted ratings, and returns the top-K ranked items.

The online retail store website 10 then displays the recommendation 44 to the user on the display 16 of the electronic device 12. The sequence of generating the query 42, receiving the recommendation 44, and displaying the recommendation 44 on the display 16 of the electronic device 12 can occur in various settings. For example, when a user selects an item for viewing, the online retail store website 10 may generate the query 42 as the (user, item) pair, and then display the store's best guess for the user's rating of the item in the view of the item. To increase user purchases, in another variation when the user views an item in a given department the query 42 is generated as the user alone (not paired with the item) but optionally with the query constrained based on the viewed item (e.g., limited to the department of the store to which the viewed item belongs. The recommendation 44 is then a set of top-K items having the highest predicted rating for the user. These top-K items are then displayed in the view of the selected item, along with suitable language such as "You may also be interested in these other available items:" or some similar explanatory language. The displayed top-K recommended items are preferably associated with hyperlinks such that user selection of one of the recommended items causes the online retail store website 10 to generate a view of the selected recommended item.

It is also to be appreciated that the disclosed recommendation techniques may be implemented as a non-transitory storage medium storing instructions executable by an electronic data processing device (such as the illustrative computer 26, optionally comprising the server supporting the online retail store website 10) to perform the disclosed recommender methods. The non-transitory storage medium may, for example, include a hard disk, RAID, or other magnetic storage medium; a DVD or other optical storage medium; a random access memory (RAM), read-only memory (ROM), flash memory or other electronic storage medium; various combinations thereof; or so forth.

Having provided an overview of the recommendation system with reference to FIG. 1, some illustrative Bayesian Matrix Factorization (BMF) approaches suitably implemented by the BMF training module 30 are described.

A simple method to factorize a large, partially observed matrix is Singular Value Decomposition (SVD), which finds a low-rank bilinear approximation of the observation matrix. Entries of the matrix are modeled by an inner product between two low-dimensional feature vectors, which are usually estimated by minimizing a squared loss. In the fully observed case, this problem can be solved by classical SVD. It is known to have a unique solution, which can be obtained by a series of rank-1 approximations applied on the residuals, i.e. the difference between the observations and the model predictions. In collaborative filtering, however, most of the entries are missing (i.e., the matrix 20 is sparse). The corresponding optimization problem is a weighted version of SVD, which is substantially more difficult to solve. Simple EM-like algorithms estimating the distribution of missing entries are typically slow to converge when the data are sparse. See Nati et al., "Weighted low-rank approximations", in 20th International Conference on Machine Learning, Citeseer, 2003. Most of the existing methods use block-coordinate gradient descent algorithms based on alternating regressions, sometimes called criss-cross regression. See Gabriel et al., "Lower rank approximation of matrices by least squares with any choice of weights", Technometrics, 21(4):489-498, 1979. Robust alternating regression can be used to add robustness against outliers and to stabilize the algorithm (i.e. to avoid local minima). See Croux et al., "Fitting multiplicative models by robust alternating regressions", Statistics and Computing, 13(1):23-36, 2003; Maronna et al., "Robust Low-Rank Approximation of Data Matrices With Element-wise Contamination", Technometrics, 50(3):295-304, 2008. Robust estimators for the weighted SVD problem provide significant improvements in terms of parameter estimation and predictive performances. While these approaches can be applied to collaborative filtering, they are ad-hoc in the sense that they were designed to alleviate the inherent difficulties of the estimation problem, but are not justified in terms of proper probabilistic modeling.

Probabilistic approaches are known that use a Gaussian noise model, commonly denoted by the term Probabilistic Matrix Factorisation (PMF). These PMF approaches have been shown to lead to significant improvements over standard SVD. See Lim et al., "Variational Bayesian approach to movie rating prediction", in KDD Cup and Workshop, 2007; Raiko et al., "Principal component analysis for sparse high-dimensional data", in 14th International Conference on Neural Information Processing (ICONIP), pages 566-575, 2007; Salakhutdinov et al., "Probabilistic matrix factorization", in Advances in Neural Information Processing Systems 21 (NIPS), 2008. The improvement over standard SVD attained by PMF is believed to be attributable to implicit smoothing included in the model. See Nakajima et al., "Implicit regularization in variational bayesian matrix factorization", in 27th International Conference on Machine Learning (ICML), 2010. While assuming Gaussian noise makes sense when the observations are continuous, it is less justified when the observations are on an ordinal scale; however, PMF has been shown to perform well on this kind of data. A possible explanation is that a continuous noise model accounts for the user's occasional mood swings and feedback of varying quality.

The full Bayesian treatment of PMF is known as Bayesian Matrix Factorization (BMF). See Salakhutdinov et al., "Bayesian probabilistic matrix factorization using Markov chain Monte Carlo", in 25th International Conference on Machine Learning (ICML), 2008. Existing BMF techniques further extend the probabilistic model by imposing Gaussian-Wishart priors over the low-rank decomposition. Id. A study of the posteriors obtained by BMF on standard movie recommendation benchmarks show that the tails are significantly stronger than the tails of the Gaussian distribution. Id.

Robustness is key to the success of practical supervised and unsupervised learning techniques. See, e.g., Mehta et al., "Robust collaborative filtering", in ACM Conference On Recommender Systems, pages 49-56, 2007 (presenting an application of M-estimators to collaborative filtering). A reduced sensitivity to model misspecifications is advantageous in order to handle outliers and atypical observations. Various approaches for enhancing robustness of BMF are disclosed herein.

In BMF approaches disclosed herein, the Gaussian distributions conventionally used in BMF are replaced by heavy-tailed distributions such as the Student-t. Such heavy tailed distributions have previously been shown to be beneficial in principal component analysis (PCA) (Archambeau et al., "Robust probabilistic projections", in 23rd International Conference on Machine Learning (ICML), pages 33-40, 2006), linear models for regression (Tipping et al., "Variational inference for Student-t models: robust Bayesian interpolation and generalized component analysis", Neurocomputing, 69:123-141, 2005), and clustering (Archambeau et al., "Robust Bayesian clustering", Neural Networks, 20:129-138, 2007). In conjunction with BMF, non-Gaussian distributions are incorporated in two different ways. First, the Gaussian noise model used in conventional BMF is replaced by a Gaussian scale mixture-based noise model. This model is closely related to a Student-t one, which is obtained by integrating out a Gamma distributed scale variable in a Gaussian scale mixture.

Additionally, the disclosed approaches model heteroscedastic noise by using variance values for the priors that are heteroscedastic across the matrix. Two rescaling factors per observation (i.e., matrix element) are provided: one due to the user (i.e., the row in the matrix 20) and one due to the item (i.e., the column in the matrix 20). It is empirically found that modeling row- and column-specific variances in bilinear forms significantly improves the predictive performance.

Still further, in some embodiments Student-t priors are employed on the latent features. The distribution of these features is non-Gaussian and exhibit heavy tails. These heavy-tailed priors further improve the quality of the rating predictions.

Various noise aspects are considered in more detail next.

Let N be the number of users and let M be the number of rated items. As shown in FIG. 1, in the illustrative examples the data are arranged in matrix 20 with rows n corresponding to users and columns m corresponding to items; however, the opposite configuration is also contemplated (i.e., rows corresponding to items and columns corresponding to users). The aim is to compute a factorized form of the rating matrix $R \in \mathbb{R}^{N \times M}$. This low-rank approximation will have the effect of pooling users and items together, which in turn facilitates predicting unobserved entries. Further let $W \in \mathbb{R}^{N \times M}$ be the indicator matrix of the observed elements of R, that is $w_{nm}$ equals 1 if $r_{nm}$ has been observed and 0 otherwise. The collaborative filtering problem can then be written as a weighted SVD problem (see Nati et al., "Weighted low-rank approximations", in 20th International Conference on Machine Learning, Citeseer, 2003):

$$\min_{\Phi,\Omega} \|W * (\Phi\Omega^T - R)\|_F^2 \qquad (1),$$

where $\|.\|_F$ is the Frobenius norm and * is the Hadamard product. The tall matrices $\Phi = (\phi_1, \ldots, \phi_N)^T \in \mathbb{R}^{N \times K}$ and $\Omega = (\omega_1, \ldots, \omega_M)^T \in \mathbb{R}^{M \times K}$ denote respectively the user-specific and item-specific feature matrix. In these notations the rows of $\Phi$ correspond to the latent row features and the rows of $\Omega$ correspond to the latent column features. Solving the weighted SVD problem is more involved than solving standard SVD as the typically used sequence of rank-1 approximations of the residuals is not guaranteed to converge to a solution of Equation (1).

Gaussian noise is first considered. A probabilistic interpretation of Equation (1) is obtained by assuming that given the latent features $\phi_n$ and $\omega_m$, the observation $r_{nm}$ is isotropic Gaussian with mean $\phi_n^T \omega_m$ and constant precision $\tau > 0$. The log-likelihood of the observed ratings is then given by:

$$\ln p(R|\Phi, \Omega, \tau) = \sum_l \ln N(r_l | \phi_{n_l}^T \omega_{m_l}, \tau), \quad (2)$$

where l now indexes the observed ratings. Further, $n_l$ ($m_l$) refers to the user index (item index) of the $l^{th}$ observed rating. The notation $1_n$ ($1_m$) refers to all observed ratings for user n (item m). A solution to Equation (1) is obtained by maximizing Equation (2) with respect to the features. To prevent overfitting, one can impose isotropic Gaussian priors on them, leading to maximum a posteriori estimators. See Salakhutdinov et al., "Probabilistic matrix factorization", in Advances in Neural Information Processing Systems 21 (NIPS), 2008 (employing this approach in PMF). Other Bayesian extensions consider Gaussian priors of various flavors. See Lim et al., "Variational Bayesian approach to movie rating prediction", in KDD Cup and Workshop, 2007; Raiko et al., "Principal component analysis for sparse high-dimensional data", in 14th International Conference on Neural Information Processing (ICONIP), pages 566-575, 2007; Salakhutdinov et al., "Bayesian probabilistic matrix factorization using Markov chain Monte Carlo", in 25th International Conference on Machine Learning (ICML), 2008.

However, those models make strong assumptions about noise: it is not only considered to be normally distributed, but it is also assumed to be homoscedastic, that is, a constant noise level across rows and columns of R is assumed. However, this assumption is questionable for some recommendation applications. For example, in movie rating applications, some users might have the tendency to give nearly constant ratings, while others might have more diverse opinions, using the full scale of ratings. A similar observation can be made about the movies (or items in general): conventional movies might have a significantly smaller variance in their ratings than avant-garde films which tend to polarize the users' appreciation. To account for this variability, simple normalization can be used (e.g. standardizing user ratings by subtracting the mean and dividing by the standard deviation), but this pre-processing is subject to estimation error (e.g. when there are few observations per item). Also, normalization is applicable, either to the rows, or the columns of R, but not to the rows and the columns simultaneously. But this is precisely the situation that concerns collaborative filtering problems.

Figure 2A:
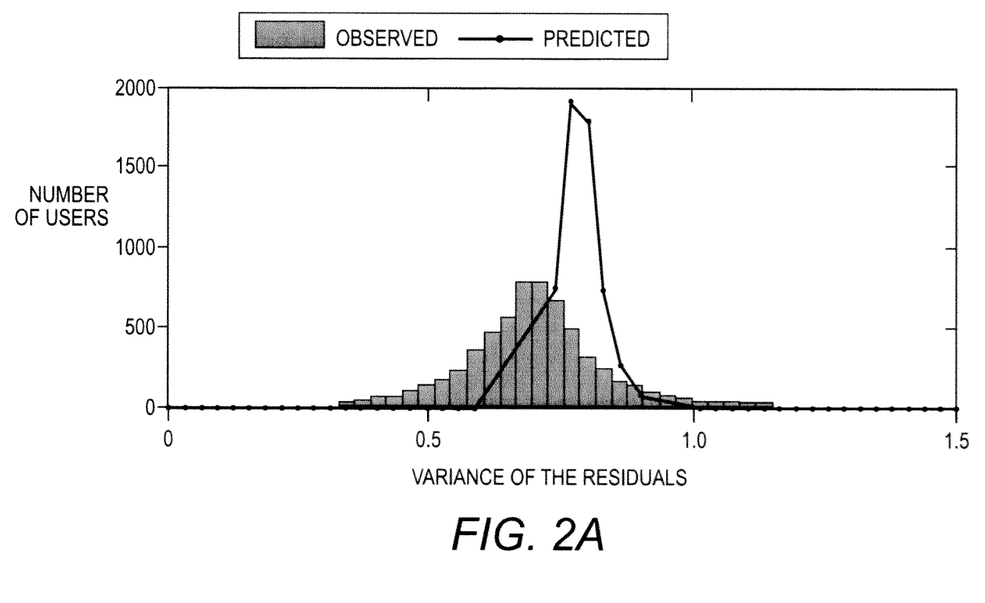
FIG. 2 plots a histogram of empirical and predicted results obtained using Probabilistic Matrix Factorization (PMF) with Gaussian priors and homoscedastic Gaussian noise.
Figure 2B:
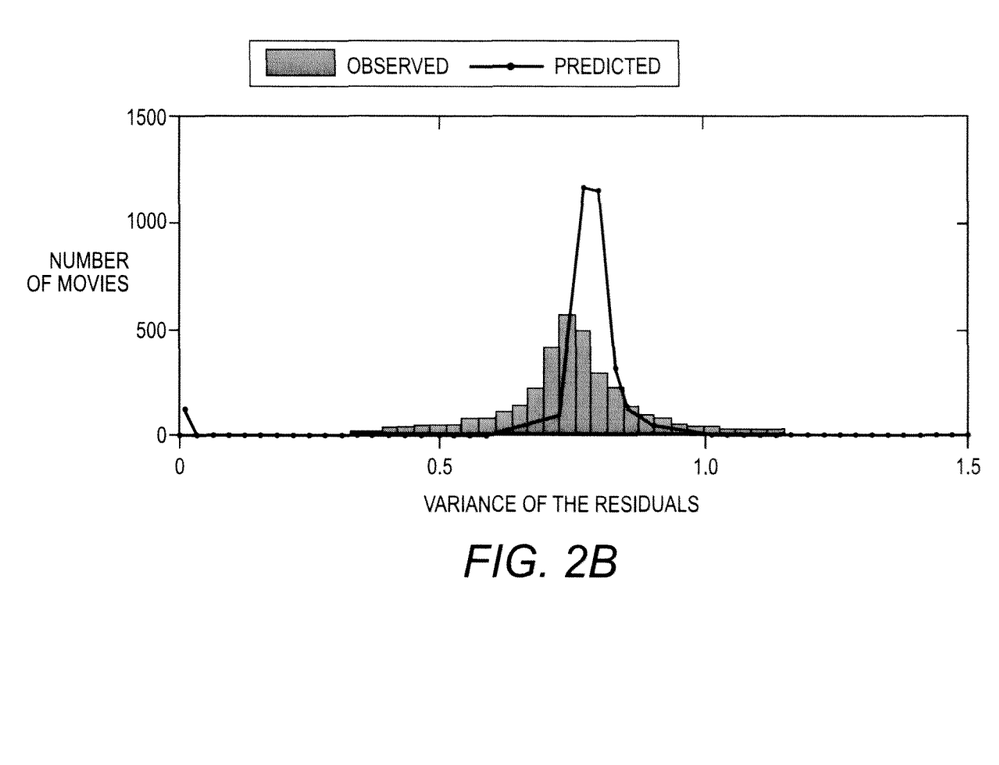

With reference to FIG. 2, an illustration is provided. The PMF solution was computed on 50% of the ratings of the One Million MovieLens data set (available at www.grouplens.org/node/73) and the remaining 50% were used to analyze the residuals, which are defined as $r_{nm} - \phi_n^T \omega_m$ for this example. For each user, the unbiased empirical variance of their ratings was computed and plotted as the histogram in FIG. 2 (top plot). The exact distribution of these variances was also computed, by sampling ratings under the PMF model assumption (i.e. Gaussian homoscedastic model) for the same features and noise as before. The resulting predicted distribution corresponds to the curve in FIG. 2 (top plot). It is seen that there is a significant mismatch between the model predictions and the actual ratings. First, the model is biased towards higher variances. Second, the range of the estimated variances would have been much smaller if the noise had followed a homoscedastic Gaussian distribution. The bottom plot of FIG. 2 corresponds to the analysis of the residuals per movie (i.e., item). Again, there is a model mismatch in terms of bias and spread.

To improve these results, it is disclosed herein to employ a heteroscedastic noise model. A natural noise structure to account for the heterogeneity in the user- and item-specific variances is the following Gaussian scale mixture noise mode:

$$\ln p(R|\Phi, \Omega, \alpha, \beta, \tau) = \sum_l \ln N(r_l | \phi_{n_l}^T \omega_{m_l}, \tau \alpha_{n_l} \beta_{m_l}). \quad (3)$$

A difference between Equation (3) and Equation (2) is that the precision of rating $r_l$ is reweighted in Equation (3) by the user-specific scale $\alpha_{n_l}$ and the item-specific scale $\beta_{m_l}$. The prior on the scale parameters is given by:

$$p(\alpha_n) = Ga\left(\alpha_n \middle| \frac{a_0}{2}, \frac{b_0}{2}\right) \quad (4)$$

$$p(\beta_m) = Ga\left(\beta_m \middle| \frac{c_0}{2}, \frac{d_0}{2}\right)$$

for all n and m. This specific choice of priors is motivated by the fact that (i) the scatter matrix of v independent multivariate Gaussian random variables is distributed according to a Wishart with v degrees of freedom and (ii) the Wishart Wi($\Sigma | v \Lambda$) reduces to $$Ga\left(\sigma^2 \middle| \frac{v}{2}, \frac{1}{2\lambda}\right)$$

in one dimension. See Christopher M. Bishop. Pattern Recognition and Machine Learning, Springer, 2006, page 693. Note that the parameters $a_0$ and $b_0$ are shared by all users, while the parameters $c_0$ and $d_0$ are shared by all items. The quantities $L_n$ and $L_m$ are respectively the number of ratings made by user n and the number of ratings for item m. The linear dependence of the shape parameter of the Gamma distribution for $\alpha_n$ ($\beta_m$) on $L_n$ ($L_m$) reflects an intuition that users (items) with higher number of ratings can be expected to exhibit lesser variance (higher precision). On the other hand, if it is not desired for the prior to be dependent on the number of observations per user or per item, these values can be set to 1.

Another improvement to BMF is next considered, namely the use of non-Gaussian priors.

A popular measure of "non-Gaussianity" is the kurtosis, which quantifies the peakedness of a distribution. A high kurtosis is related to the distribution tails as more of the variance is due to infrequent, possibly relatively extreme deviations. Student-t and other Gaussian scale mixtures have a kurtosis typically higher than that of the Gaussian. It has been shown that probabilistic principal component analysis (PCA) with Student-t features leads to improved models of large dimensional data. See Archambeau et al., "Robust probabilistic projections", in 23rd International Conference on Machine Learning (ICML), pages 33-40, 2006. In the context of collaborative filtering, this is equivalent to imposing Gaussian scale mixtures priors on the feature according to:

$$p(\Phi) = \Pi_n \int \mathcal{N}(\phi_n | 0, \alpha_n \Lambda_\phi) p(\alpha_n) d\alpha_n \quad (5)$$

and $$p(\Phi) = \Pi_m \int \mathcal{N}(\omega_m | 0, \beta_m \Lambda_\omega) p(\beta_n) d\beta_n \quad (6)$$

where $p(\alpha_n)$ and $p(\beta_n)$ are given by Equation (4).

In a suitable approach, $\Lambda_\phi$ and $\Lambda_\omega$ are restricted to be diagonal precision matrices, such as $\Lambda_\phi^{-1} = \text{diag}\{\sigma_1^2,$ $\sigma_2^2, \ldots, \sigma_K^2\}$ and $\Lambda_\omega^{-1} = \text{diag}\{\rho_1^2, \rho_2^2, \ldots, \rho_K^2\}$. The integrals of Equations (5) and (6) are analytically tractable and lead to multivariate Student-t distributions.

A suitable construction of the variational inference is next considered. Of interest is a deterministic approximation of the full Bayesian Matrix Factorization problem. A variational Expectation-Maximization (EM) approach is suitably employed. See Neal et al., "A view of the EM algorithm that justifies incremental, sparse, and other variants", *Learning in graphical models*; H. Attias, "A variational Baysian framework for graphical models", in Advances in Neural Information Processing Systems 12 (NIPS), 2000; Matthew J. Beal, *Variational Algorithms for Approximate Bayesian Inference*, PhD thesis, Gatsby Computational Neuroscience Unit, University College London, 2003. In this approach, the log-marginal likelihood is lower bounded by the negative variational free energy:

$$\ln p(\mathbf{R}) = -\mathcal{F}(q,\theta) + \mathcal{KL}(q(z)\|p(z|\mathbf{R},\theta)) \geq -\mathcal{F}(q,\theta)$$

where $z = \{\Phi, \Omega, \alpha, \beta\}$ are the latent variables, $\theta = \{\tau, \Lambda_\phi, \Lambda_\omega, a_0, b_0, c_0, d_0\}$ are the parameters and the variational free energy $\mathcal{F}$ is defined as follows:

$$\mathcal{F} = -\langle \ln p(R,z|\theta) \rangle_q - H[q] \quad (7)$$

In order to find a tractable solution, it is in general assumed that the variational approximate posterior q fully factorizes, that is $q(z) = q(\Phi), q(\Omega), q(\alpha), q(\beta)$. This approach is known as mean field. See, e.g., Christopher M. Bishop, *Pattern Recognition and Machine Learning*, Springer, 2006. In this work we also consider a structured variational approximation (Wim Wiegerinck, "Variational approximations between mean field theory and the junction tree algorithm", in Uncertainty in Artificial Intelligence (UAI), pages 626-633, 2000) of the form $q(z) = q(\Phi, \alpha), q(\Omega, \beta)$. Structured variational approximations have been shown to be beneficial in practice as the correlations between latent variables are not unnecessarily ignored and they reduce the bound gap. See, e.g. Archambeau et al., "Robust Bayesian clustering", Neural Networks, 20:129-138, 2007.

Three illustrative embodiments are next set forth: (1) an embodiment employing Gaussian priors on features and non-Gaussian (namely Gaussian Scale Mixture) noise (called the "RG" embodiment herein); (2) an embodiment employing non-Gaussian (namely Student-t) priors and Gaussian noise (called the "GR" embodiment herein); and (3) an embodiment employing both non-Gaussian (namely Student-t) priors and non-Gaussian (namely Gaussian Scale Mixture) noise (called the "RR" embodiment herein).

The RG embodiment employing Gaussian priors on features and Gaussian Scale Mixture noise is implemented as follows. In this case, the mean field approximation leads to the following Gaussian variational posteriors for the latent features:

$$q(\Phi) = \Pi_n \mathcal{N}(\phi_n|\bar{\phi}_n, \bar{S}_n)$$

$$q(\Omega) = \Pi_m \mathcal{N}(\omega_n|\bar{\omega}_n, \bar{R}_n)$$

where $$\bar{\phi}_n = \tau \bar{\alpha}_n \bar{S}_n^{-1} \Sigma_l \bar{\beta}_{m_l} \bar{\omega}_{m_l} r_l$$

$$\bar{S}_n = \tau \bar{\alpha}_n \Sigma_{l_n} \langle \beta_{m_l} \omega_{m_l} \omega_{m_l}^T \rangle + \Lambda_\phi$$

$$\bar{\omega}_m = \tau \beta_m \bar{R}_m^{-1} \Sigma_{l_m} \bar{\alpha}_{n_l} \bar{\phi}_{n_l} r_l$$

$$\bar{R}_m = \tau \bar{\beta}_m \Sigma_{l_m} \langle \alpha_{n_l} \phi_{n_l} \phi_{n_l}^T \rangle + \Lambda_\omega$$

The variational posteriors for the scale parameters are $$q(\alpha) = \Pi_n G_a\left(\alpha_n \left| \frac{a_n}{2}, \frac{b_n}{2}\right.\right) \text{ and } q(\beta) = \Pi_m G_a\left(\beta_m \left| \frac{c_m}{2}, \frac{d_m}{2}\right.\right).$$

Their parameters are given by:

$$a_n = a_0 + 1,$$

$$b_n = b_0 + \tau \Sigma_{l_n} \langle \beta_{m_l}(r_l - \phi_n^T \omega_{m_l})^2 \rangle$$

$$c_m = c_0 + 1,$$

$$d_m = d_0 + \tau \Sigma_{l_m} \langle \alpha_{n_l}(r_l - \phi_{n_l}^T \omega_m)^2 \rangle$$

The GR embodiment employing Student-t priors and Gaussian noise is implemented as follows. We consider a structured variational approximation by restricting the variational posteriors for $\Phi$ and $\Omega$ to be of the same form as the priors, that is Gaussians with scaled covariances:

$$q(\Phi|\alpha) = \Pi_n \mathcal{N}(\phi_n|\bar{\phi}_n, \alpha_n \bar{S}_n) \quad (8)$$

and $$q(\Omega|\beta) = \Pi_m \mathcal{N}(\omega_m|\bar{\omega}_m, \beta_m \bar{R}_m) \quad (9).$$

Direct maximization of the bound $-\mathcal{F}$ with respect to $\bar{\phi}_n$ and $\bar{S}_n$, as well as $\bar{\omega}_m$ and $\bar{R}_m$ leads to:

$$\bar{\phi}_n = \tau \tilde{S}_n^{-1} \Sigma_{l_n} \bar{\omega}_{m_l} r_l$$

$$\bar{S}_n = \tau \langle \alpha_n^{-1} \rangle \Sigma_{l_n} \langle \omega_{m_l} \omega_{m_l}^T \rangle + \Lambda_\phi$$

$$\bar{\omega}_m = \tau \tilde{R}_m^{-1} \Sigma_{l_m} \bar{\phi}_{n_l} r_l$$

$$\bar{R}_m = \tau \langle \beta_m^{-1} \rangle \Sigma_{l_m} \langle \phi_{n_l} \phi_{n_l}^T \rangle + \Lambda_\omega$$

where $\tilde{S}_n = \tau \Sigma_{l_n} \langle \omega_{m_l} \omega_{m_l}^T \rangle + \bar{\alpha}_n \Lambda_\phi$ and $\tilde{R}_m = \tau \Sigma_{l_m} \langle \phi_{n_l} \phi_{n_l}^T \rangle + \bar{\beta}_m \Lambda_\omega$. The posterior for the scale parameters are suitably written as $q(\Phi, \alpha) = \Pi_n q(\phi_n, \alpha_n)$ and $q(\Omega, \beta) = \Pi_m q(\omega_m, \beta_m)$. The first of these posteriors is obtained as follows. Consider the observed variable x and the set of latent variables $y = \{y_k\}_k$ and $z = \{z_k\}_k$. The posterior $q(z_k)$ can be computed as follows when considering a structured Q variational approximation with joint posterior $q(y,z) = \Pi_k q(y_k, z_k)$. Assume the marginal $p(x)$ is analytically intractable. The variational lower bound is defined as $-\mathcal{F}(q) = \langle \ln p(x,y,z) \rangle_{q(y,z)} - H[(y,z)]$, where $q(y,z) = \Pi_k q(y_k, z_k)$. Denote the incomplete product $\Pi_k q(y_k, z_k)$ by $q(y_{\backslash k}, z_{\backslash k})$. Exploiting the specific form of the variational posterior and ignoring terms independent of $z_k$, we obtain:

$$-\mathcal{F}(q) = \int \langle \ln p(x,y,z) \rangle_{q(y_k|z_k)q(y_{\backslash k},z_{\backslash k})} q(z_k) dz_k +$$

$$\int H[q(y_k|z_k)]q(z_k)dz_k + H[q(z_k)] + \text{const}$$

$$= \int \ln e^{\langle \ln p(x,y,z) \rangle_{q(y_k|z_k)q(y_{\backslash k},z_{\backslash k})} + H[q(y_k|z_k)]} q(z_k) dz_k +$$

$$H[q(z_k)] + \text{const}$$

Up to a normalizing constant Z we have that $-\mathcal{F}(q)$ is equal to:

$$-\mathcal{KL}\left(q(z_k) \left\| \frac{1}{Z} e^{\langle \ln p(x,y,z) \rangle_{q(y_k|z_k)q(y_{\backslash k},z_{\backslash k})} + H[q(y_k|z_k)]} \right.\right)$$

Hence, when assuming q ($\Phi$, $\alpha$)=$\Pi_n$ q($\phi_n$, $\alpha_n$), then the bound of Equation is maximal if:

$$q(\alpha_n) \propto e^{\langle \ln p(R,\Phi,\Omega,\alpha,\beta)\rangle_{q(\phi_n|\alpha_n)q(\Phi_{\backslash n},\alpha_{\backslash n})q(\Omega,\beta)} \times e^{H[q(\phi_n|\alpha_n)]}}$$

where q($\Phi_{\backslash k}$, $\alpha_{\backslash k}$)=$\Pi_{n'\neq n}$ ($\phi_{n'}$, $\alpha_{n'}$). The variational posterior q($\beta_m$) is obtained in the same manner.

While the variational posteriors of the scale variables are not Gamma distributions in this case, they can be recognized as products of generalized inverse Gaussians:

$$q(\alpha) = \prod_n \mathcal{N}^{-1}\left(\alpha_n \mid \frac{\nu_n}{2}, \chi_n, \phi_n\right)$$

and $$q(\beta) = \prod_m \mathcal{N}^{-1}\left(\beta_m \mid \frac{\nu_m}{2}, \chi_m, \phi_m\right)$$

where the parameters are defined as follows:

$$\nu_n = a_0 \qquad \nu_m = c_0$$
$$\chi_n = \tau\Sigma_{l_n}\langle w_{m_l}^T \overline{S}_n^{-1} w_{m_l}\rangle \quad \chi_m = \tau\Sigma_{l_m}\langle \phi_{n_l}^T \overline{R}_m^{-1} \phi_{n_l}\rangle$$
$$\varphi_n = b_0 + \overline{\phi}_n^T \Lambda_\phi \overline{\phi}_n \qquad \varphi_m = d_0 + \overline{w}_m^T \Lambda_w \overline{w}_m$$

The generalized inverse Gaussian distribution is given by (see B. Jørgensen, *Statistical Properties of the Generalized Inverse Gaussian Distribution*, Springer-Verlag, 1982):

$$\mathcal{N}^{-1}(x \mid \nu, \chi, \varphi) = \frac{1}{\mathcal{Z}(\nu, \chi, \varphi)} x^{\nu-1} e^{-\frac{1}{2}} e^{-\frac{1}{2}(\chi x^{-1} + \varphi x)}$$

where $$\mathcal{Z}(\nu, \chi, \varphi) = 2(\chi/\phi)^{\nu/2} K_\nu(\sqrt{\chi\varphi})$$

with $K_\nu(.)$ denoting the modified Bessel function of the second kind with index $\nu\in\mathbb{R}$. The following expectations are useful:

$$\langle x \rangle = \sqrt{\frac{\chi}{\phi}} R_\nu(\sqrt{\chi\phi}),$$

$$\langle x^{-1} \rangle = \sqrt{\frac{\phi}{\chi}} R_{-\nu}(\sqrt{\chi\phi}),$$

and $$\langle \ln x \rangle = \ln\sqrt{\frac{\chi}{\phi}} + \frac{d\ln K_\nu(\sqrt{\chi\phi})}{d\nu},$$

where we defined $R_\nu(.)=K_{\nu+1}(.)/K_\nu(.)$. When $\chi=0$ and $\nu>0$, the generalized inverse Gaussian reduces to the Gamma:

$$Ga(x \mid a, b) = \frac{b^a}{\Gamma(a)} x^{a-1} e^{-bx}$$

where a, b>0 and $\Gamma(.)$ is the (complete) gamma function. It is straightforward to verify this result by setting a=$\nu$ and b=$\phi$/2, and noting that $\lim_{z\to 0} K_\nu(z)=\Gamma(\nu)2^{\nu-1}z^{-\nu}$ for $\nu>0$.

The RR embodiment employing both Student-t priors on the features and Gaussian Scale Mixture noise is implemented as follows. We consider a structured variational approximation for the case where both the noise and the priors are Gaussian scale mixtures. It can be shown that the form of the variational posterior that arises is given by Equations (8) and (9) with parameters now defined by:

$$\overline{\phi}_n = \tau \overline{S}_n^{-1} \Sigma_{l_n} \overline{\beta}_{m_l} \overline{w}_{m_l} r_l$$

$$\overline{S}_n = \tau\Sigma_{l_n}\langle \beta_{m_l} w_{m_l} w_{m_l}^T\rangle + \Lambda_\phi$$

$$\overline{w}_m = \tau \overline{R}_m^{-1} \Sigma_{l_m} \overline{\alpha}_{n_l} \overline{\phi}_{n_l} r_l$$

$$\overline{R}_m = \tau\Sigma_{l_m}\langle \alpha_{n_l} \phi_{n_l} \phi_{n_l}^T\rangle + \Lambda_w$$

The variational posteriors for the scale parameters are Gamma distributions with parameters given by:

$$a_n = a_0 + 1$$

$$b_n = b_0 + \tau\Sigma_{l_n}\langle \beta_{m_l}(r_l - \overline{\phi}_n^T w_{m_l})^2\rangle + \overline{\phi}_n^T \Lambda_\phi \overline{\phi}_n$$

$$c_m = c_0 + 1$$

$$d_m = d_0 + \tau\Sigma_{l_m}\langle \alpha_{n_l}(r_l - \phi_{n_l}^T \overline{w}_m)^2\rangle \overline{w}_m^T \Lambda_m \overline{w}_m$$

The BMF estimation is carried out as follows. The parameters are estimated by type II maximum likelihood (or empirical Bayes). The updates are obtained by direct maximization of $-\mathcal{F}$.

When the noise is a Gaussian scale mixture and the priors on the latent features are Student-t distributions, the updates for the parameters are given by:

$$\tau^{-1} \leftarrow \frac{\sum_l \langle \alpha_{n_l} \beta_{m_l}(r_l - \phi_{n_l}^T \omega_{m_l})^2\rangle}{L},$$

$$\sigma_k^2 \leftarrow \frac{\sum_n \langle \alpha_n \phi_n \phi_n^T\rangle_{kk}}{N}, \quad b_0 \leftarrow \frac{a_0 N}{\sum_n \overline{\alpha}_n}$$

$$\rho_k^2 \leftarrow \frac{\sum_m \langle \beta_m \omega_m \omega_m^T\rangle_{kk}}{M}, \quad d_0 \leftarrow \frac{c_0 M}{\sum_m \overline{\beta}_m}$$

Parameter $a_o$ is suitably found by solving the nonlinear equation $$\sum_n \left\{\ln\frac{b_0}{2} + \langle\ln\alpha_n\rangle - \psi\left(\frac{a_0}{2}\right)\right\} = 0$$

by line search. Parameter $c_0$ is updated in the same manner.

When the noise is Gaussian, the update for the precision is replaced by:

$$\tau^{-1} \leftarrow \frac{\sum_l \langle (r_l - \phi_{n_l}^T \omega_{m_l})^2 \rangle}{L}$$

When the priors on the latent features are Gaussians, the updates for the diagonal elements $\Lambda_\phi$ and $\Lambda_\omega$ are replaced by:

$$\sigma_k^2 \leftarrow \frac{\sum_n \langle \phi_n \phi_n^T \rangle_{kk}}{N}$$

and $$\rho_k^2 \leftarrow \frac{\sum_m \langle \omega_m \omega_m^T \rangle_{kk}}{M}$$

Figure 3:
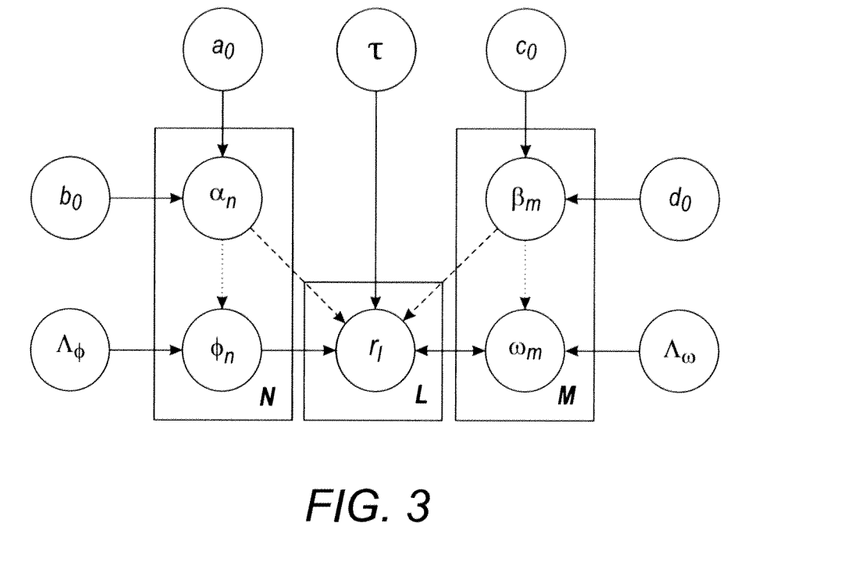
FIG. 3 diagrammatically shows Bayesian Matrix Factorization (BMF) models suitably employed by the recommender system of FIG. 1.

FIG. 3 shows graphical models for the different matrix factorizations. The embodiment employing both Gaussian priors and Gaussian noise (e.g., a "GG" model) is obtained when only considering the solid arrows of FIG. 3. The GR embodiment employing Student-t priors and Gaussian noise is obtained when considering the solid and dotted arrows. The RG embodiment employing Gaussian priors and Gaussian Scale Mixture noise is obtained when considering the solid and the dashed arrows. Finally, the RR embodiment employing both Student-t priors and Gaussian Scale Mixture noise is obtained when considering all the arrows.

In practice, it is important to model the user- (or item-) specific offsets. These can be incorporated into the model by appending a '1' to the latent item feature $\omega_m$ (or the latent user feature $\phi_n$). Also, the model is only identifiable up to a rescaling of $\Phi$ and $\Omega$. Thus, we can fix $\Lambda_\omega$ to the identity matrix $I_K$ and only optimize with respect to $\Lambda_\phi$. In order to scale up the model to a large K, it is convenient to restrict $\bar{S}_n$ and $\bar{R}_m$ to be diagonal matrices. Hence, it is only required to store K variance parameters per user and per item, while the computational cost of inverting these matrices is reduced from $\mathcal{O}(K^3)$ to $\mathcal{O}(K)$.

The disclosed recommender approaches have been tested on two datasets, referred to herein as the MovieLens dataset and the JesterJoke dataset. The MovieLens dataset (see www.grouplens.org/node/73) contains movie ratings by MovieLens users. The ratings are ordinal values on the scale 1 to 5. Users have rated at least 20 movies. The MovieLens 100K and the MovieLens 1 Million rating data sets were considered. The former consists of approximately 100,000 ratings by 943 users on 1682 movies, while the latter contains 1,000,209 ratings of approximately 3,900 movies by 6,040 users.

The JesterJoke dataset is described, for example, in Goldberg et al., "Eigentaste: A constant time collaborative filtering algorithm", Information Retrieval, 4(2):133-151, 2001). The Jester-1 data set contains 4.1 million ratings of 100 jokes from 73,421 users. Tests used Jester-1-3, which is a subset of Jester-1 containing ratings of 24,938 users who have rated between 15 and 35 jokes. These ratings are on a continuous scale from −10.0 to 10.0.

The experimental setup was as follows. We randomly choose 70% of the ratings for training and use the remaining ratings as test data. Every movie and every user appears at least once in the training set. In the MovieLens data sets, we include only movies that have been rated at least three times. We are interested in evaluating the effect of the noise model and of the priors imposed on the latent factors. To this effect, we compare the following models on the rating prediction task: (see FIG. 3 for the graphical representation of the models): (1) the GG model (Gaussian noise, Gaussian priors, see Lim et al., "Variational Bayesian approach to movie rating prediction", in KDD Cup and Workshop, 2007); (2) the RG model (Gaussian scale mixture noise, Gaussian priors); (3) the GR model (Gaussian noise, Student-t priors); and (4) the RR model (Gaussian scale mixture noise, Student-t priors). (In the embodiment or label notation, "G" denotes "Gaussian" while "R" denotes a heavy tailed distribution). Additionally, results are presented for the mean field approximation of the GR model, referred to as GR-mf in the following. Comparing the performance of GR and GR-mf clarifies the gains that can be obtained through the use of a structured variational inference algorithm in place of a standard mean field algorithm.

Prediction was done by using point estimates of both $\Phi$ and $\Omega$. We compare the models in terms of predictive performance based on several metrics. The root-mean-squared-error (RMSE) is given by:

$$RMSE = \sqrt{\frac{1}{T} \sum_t \left( r_t - \bar{\phi}_{n_t}^T \bar{\omega}_{m_t} \right)^2}$$

where t indexes the test ratings. This metric is closely related to the Gaussian noise model. Another metric used was the Mean-absolute-error (MAE) given by:

$$MAE = \frac{1}{T} \sum_t \left| r_t - \bar{\phi}_{n_t}^T \bar{\omega}_{m_t} \right|$$

Another metric used was the Ordinal log-likelihood (OLL). This metric is only used in the case of the MovieLens data. Since the true ratings are ordinal, the predicted rating needs to be rounded off to predict a value in the support of the original ratings. It is possible to compute the likelihood of the predicted value lying within the boundaries corresponding to the true rating. We compute this log-likelihood in the same fashion as described in Chu et al., "Gaussian processes for ordinal regression", Journal of Machine Learning Research, 6(1): 1019-1041, 2005. Let us denote the boundaries defining the ordinal scale $\{b_0, b_1, b_2, b_3, b_4, b_5\}$. In our experiments we do not attempt to optimize these values, but used $b_0 = -\infty$, $b_i = i + 0.5$, $b_5 = \infty$. The ordinal likelihood for the Gaussian noise model is given by:

$$P(r_t = i) \approx \int_{b_{i-1} - \bar{\phi}_{n_t}^T \bar{\omega}_{m_t}}^{b_i - \bar{\phi}_{n_t}^T \bar{\omega}_{m_t}} \mathcal{N}(\epsilon_t \mid 0, \langle \tau \rangle) d\epsilon_t$$

where $\epsilon_t$ is the prediction error (or residual) and $i \in \{1,2,3,4,5\}$. For the Gaussian scale mixture noise model, we use again point estimates, leading to the following approximation:

$$P(r_t = i) \approx \int_{b_{i-1} - \vec{a}_{n_t}^T \vec{\omega}_{m_t}}^{b_i - \vec{a}_{n_t}^T \vec{\omega}_{m_t}} \mathcal{N}(\epsilon_t \mid 0, \overline{\alpha}_{n_t} \overline{\beta}_{m_t} \langle \tau \rangle) d\epsilon_t$$

The RMSE, MAE and OLL values obtained for MovieLens 100 k data are shown in TABLE 1. The dimension of the low-rank approximation is set to K=30. Considering the GG model as the reference method, we see that the performance improves on all metrics when a Student-t prior is imposed on the latent features (the GR model) or when a Gaussian scale mixture noise is considered (the RG model). The combination of both (the RR model) further improves the results. The mean field approximation performs worse than the structure variational one. This result, however, is to be mitigated given the fact that GR-mf performs better than GR on MovieLens Million data (TABLE 2).

TABLE 1

Test results on the MovieLens 100 k dataset using K = 30

| Model | RMSE | MAE | OLL |
|---|---|---|---|
| RR | 0.900 | 0.613 | −37638 |
| RG | 0.901 | 0.674 | −37054 |
| GR | 0.906 | 0.621 | −38193 |
| GR-mf | 0.907 | 0.710 | −38312 |
| GG | 0.912 | 0.714 | −38387 |

TABLE 2

Test results on the MovieLens Million rating data using K = 20

| Model | RMSE | MAE | OLL |
|---|---|---|---|
| RR | 0.845 | 0.661 | −356254 |
| RG | 0.846 | 0.662 | −350607 |
| GR | 0.860 | 0.673 | −366028 |
| GR-mf | 0.858 | 0.670 | −366109 |
| GG | 0.851 | 0.666 | −364736 |

We conducted two additional experiments on the Movielens 100K data set to check whether the priors on the scale variables $\alpha_n$ and $\beta_m$ should depend on the number of ratings $L_n$ and $L_m$. We observed that priors independent of the data yielded a lower test RMSE.

The Gaussian scale mixture noise models (RG and RR) performed significantly better for all metrics compared to the Gaussian noise models (GG and GR). This suggests that a user- and item-specific rescaling is beneficial. We obtained better performances in terms of RMSE and similar ones in terms of MAE as the ones reported in Nicolas et al., "Collaborative filtering with interlaced generalized linear models", Neurocomputing, 71:1300-1310, 2008. That reference considered generalized bilinear forms. The number of latent factors K was not optimized for performances, but the BMF model is nearly optimum in this case: the best performance obtained with GG is for K=30, with RMSE=0.849, MAE=0.664 and OLL=−363690. While better than the results shown in TABLE 2, these are still worse than the ones obtained for the RG and RR models which employ Gaussian scale mixture noise models.

TABLE 3

Test results on Jester-1-3 dataset for K = 15

| Model | RMSE | MAE |
|---|---|---|
| RR | 4.454 | 3.439 |
| RG | 4.456 | 3.468 |
| GR | 4.463 | 3.451 |
| GG | 4.406 | 3.480 |

We also tested the algorithm on the Jester-1-3 data sets as summarized in TABLE 3. We note that the GG model performs best in terms of RMSE, but worst in terms of MAE. The RMSE corresponds exactly to the loss that is minimized in Gaussian BMF; this means that using a Gaussian model is asymptotically optimal. Since only users with at least 15 ratings were selected in this dataset, the variance reduction due to the use of a robust estimator is not large enough to improve the test RMSE. Although RMSE is the most commonly used metric in collaborative filtering, it is not a robust measure for assessing the model predictive performance (see Benjamin Marlin, *Missing Data Problems in Machine Learning*. PhD thesis, Department of Computer Science, University of Toronto, 2008), especially when the distribution of the data is peaked and even if they take values on a finite domain. Finally, note that we observe the same hierarchy of models in terms of MAE as the one obtained on the MovieLens 100 k data, namely RR<GR<RG<GG.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
an electronic data processing device configured to perform a recommender method including:
performing Bayesian Matrix Factorization (BMF) on a matrix having user and item dimensions using Gaussian scale mixture priors comprising Student-t priors to train a probabilistic collaborative filtering model; and
generating a recommendation for a user comprising a predicted item rating or identification of one or more recommended items using the probabilistic collaborative filtering model.

2. The apparatus of claim 1, wherein the BMF is performed using variance values for the Gaussian scale mixture priors that are heteroscedastic across the matrix.

3. The apparatus of claim 1, wherein the Gaussian scale mixture priors have variance values that include (1) a row-dependent variance component that depends upon the matrix row and (2) a column-dependent variance component that depends upon the matrix column.

4. The apparatus of claim 1, wherein the BMF adds noise that varies with both row and column position in the matrix.

5. The apparatus of claim 1, further comprising:
an online retail store website embodied by one or more Internet-based server computers, the online retail store website displaying the recommendation to the user via an electronic device having a display that is operatively connected with the online retail store website via the Internet.

6. The apparatus of claim 5, wherein the electronic data processing device is said one or more Internet-based server computers.

7. A storage medium storing instructions executable by an electronic data processing device to perform a recommender method including: (i) performing Bayesian Matrix Factorization (BMF) on a matrix having user and item dimensions using priors having heteroscedastic noise terms that vary with both row and column position in the matrix to train a probabilistic collaborative filtering model and (ii) generating a recommendation for a user comprising a predicted item rating or identification of one or more recommended items using the probabilistic collaborative filtering model.

8. The storage medium of claim 7, wherein the priors comprise Gaussian priors.

9. The storage medium of claim 7, wherein the priors comprise non-Gaussian priors.

10. The storage medium of claim 9, wherein the non-Gaussian priors comprise Gaussian scale mixture priors.

11. The storage medium of claim 10, wherein the heteroscedastic noise terms comprise variance values of the Gaussian scale mixture priors that include (1) a row-dependent variance component that depends upon the matrix row and (2) a column-dependent variance component that depends upon the matrix column.

12. The storage medium of claim 9, wherein the non-Gaussian priors are Student-t priors.

13. A method comprising:
performing Bayesian Matrix Factorization (BMF) on a matrix having user and item dimensions and matrix elements containing user ratings for items made by users wherein the BMF employs priors that include (1) a row-dependent variance component that depends upon the matrix row and (2) a column-dependent variance component that depends upon the matrix column to train a probabilistic collaborative filtering model; and
generating a recommendation for a user comprising a predicted item rating or identification of one or more recommended items using the probabilistic collaborative filtering model;
wherein the performing and the generating are performed by an electronic data processing device.

14. The method of claim 13, wherein the priors comprise non-Gaussian priors.

15. The method of claim 14, wherein the non-Gaussian priors comprise Gaussian scale mixture priors.

16. The method of claim 13, wherein the priors comprise Student-t priors.

17. The method of claim 13, wherein one of:
(I) the rows of the matrix correspond to users and the row-dependent variance component depends on the number of user ratings made by the user corresponding to the row, and
(ii) the columns of the matrix correspond to users and the column-dependent variance component depends on the number of user ratings made by the user corresponding to the column.

18. The method of claim 13, wherein one of:
(I) the columns of the matrix correspond to items and the column-dependent variance component depends on the number of user ratings for the item corresponding to the column, and
(ii) the rows of the matrix correspond to items and the row-dependent variance component depends on the number of user ratings for the item corresponding to the row.

* * * * *